(12) United States Patent
Petterson et al.

(10) Patent No.: US 6,371,046 B1
(45) Date of Patent: Apr. 16, 2002

(54) METHOD AND AN APPARATUS FOR SEPARATION OF FOREMILK

(75) Inventors: Torbjorn Petterson, Gnesta; Jonas Lundwall, Tullinge; Otto Hellekant, Ronninge; Pernilla Hanssen, Vasteras; Thomas Axelsson, Farsta; Leif Lindholm, Ronninge; Lars Andersson, Sodertalje, all of (SE)

(73) Assignee: De Laval Holding AB, Tumba (SE)

( * ) Notice: Subject to any disclaimer, the term of this patent is extended or adjusted under 35 U.S.C. 154(b) by 0 days.

(21) Appl. No.: 09/581,917

(22) PCT Filed: Dec. 21, 1998

(86) PCT No.: PCT/SE98/02409

§ 371 Date: Sep. 11, 2000

§ 102(e) Date: Sep. 11, 2000

(87) PCT Pub. No.: WO99/31966

PCT Pub. Date: Jul. 1, 1999

(30) Foreign Application Priority Data

Dec. 19, 1997 (SE) .............................................. 9704781

(51) Int. Cl.⁷ ................................................ A01J 5/007
(52) U.S. Cl. .................................. 119/14.02; 119/14.08
(58) Field of Search .......................... 119/14.02, 14.08, 119/14.14, 14.15, 14.54, 14.55

(56) References Cited

U.S. PATENT DOCUMENTS

| | | | | |
|---|---|---|---|---|
| 5,664,521 A | * | 9/1997 | Simpson et al. | 119/14.02 |
| 5,722,343 A | * | 3/1998 | Aurik et al. | 119/14.02 |
| 5,865,138 A | * | 2/1999 | Lely | 119/14.02 |
| 6,073,580 A | * | 6/2000 | Graupner et al. | 119/14.08 |
| 6,155,204 A | * | 12/2000 | van der Lely et al. | 119/14.02 |

FOREIGN PATENT DOCUMENTS

| | | |
|---|---|---|
| DE | 40 07 327 | 7/1991 |
| EP | 0 385 539 | 9/1990 |
| EP | 0 399 604 | 10/1997 |
| EP | 0 801 893 | 10/1997 |
| SE | 406 414 | 2/1979 |
| SU | 1251 543 | 11/1987 |
| WO | WO 96/11568 | 4/1996 |
| WO | WO 97/18701 | 5/1997 |

* cited by examiner

Primary Examiner—Yvonne R. Abott
(74) Attorney, Agent, or Firm—Young & Thompson

(57) ABSTRACT

The present invention relates to a method for automatic separation of foremilk and/or milk not suitable for consumption from the milk line system of a milking plant and an apparatus for carrying out said method. A separating device (44) is arranged at the ends of a milk line (52) and a test milk line (56), said milk lines being parallel. The separating device is designed with a damper means (48) attached to a cup (46). When milk is fed through the outlet (16), the cup (46) is filled up and its weight pivots the separating device from a first position, in which the inlet to a milk line (52) is closed by means of the damper mean, to a second position, in which the milk in cup is poured into a test milk line (56) and the damper means is lifted off the inlet (50[) ]to the milk line (52).

19 Claims, 5 Drawing Sheets

METHOD AND AN APPARATUS FOR SEPARATION OF FOREMILK

TECHNICAL FIELD OF THE INVENTION

The present invention relates to a method for automatic separation of foremilk and/or milk not suitable for consumption from the milk line system of a milking plant.

The invention also relates to an apparatus for cab out said method of separation, comprising means for separating and receiving a controlled quantity of milk.

BACKGROUND OF THE INVENTION

The first phase of milking is normally referred to as the premilking phase and one essential step in the milking process for lactating animals is the performance of a proper premilking phase. It is well known that the drops of milk leaving the teat may be contaminated due to contamination on the outside of the teat or in the teat orifice, the teat canal or teat cistern and therefore the first drops are preferably discarded.

During said premilking phase it is normally desirable that the entire quantity of milk contained in the teat is extracted. This is primarily due to the requirement of checking tat the milk is suitable for consumption and does not include any traces of mastitis or contamination which for natal reasons are more likely to be present in the milk stored in the teat than in the milk from the udder cistern. Moreover, even though the teat normally is cleaned before the premilking takes place, it may occur that residues of dirt are present in the opening of the teat canal. At the same time, one does not wish to extract more milk during premilking than is absolutely necessary, since this milk is normally discarded off and therefore represents a cost.

Form ADD 261 300 is previously known a method and an apparatus for milking, comprising premilking and feeding of the foremilk via a central unit and a specific milk tube to a device with sensors for determining whether the milk is approved for entrance into the milk line system. An early diagnosis on actors depending on cow health can be made as well. After a test result concerning the foremilk-sample has been obtained, and the mil-quality has been approved, the apparatus is switched to a main milking phase. This is accomplished by manoeuvering a valve, by means of which the passage between the central unit and a regular long milk tube is opened and the passage to the specific milk tube is closed. The milk now flows via the long milk tube into the milk line system. When the test result reveals that the milk quality is inadequate, the valve remains in its position for sampling of foremilk and the milk is fed via the specific milk tube and a combination of valves into a milk line for non-approved milk. However, there are no references to milk sampling carried out for making an analysis of each teat or each add quarter.

From EP-A-0 277 396 is previously known a method for milking, comprising the use of a four-way valve connected to a conduit or short milk tube on each teatcup, by means of which valve milk and washing agent can be carried to different lines. In one described method a milk quality meter is applied, which is arranged on the conduit and measures the conductivity of milk or washing agent, as a result of which a regulating member can determine into which position a control member must actuate the four-way valve. The regulating member determines on the basis of the milk quality measured, at which precise moment the control member must switch over the four-way valve. If a teat of a cow is infected, a milk quality meter can be incorporated, which in addition to measuring the difference between milk and washing agent also measures the difference between milk suitable and milk not suitable for consumption. Upon proper regulation of the four-way valve it is possible to discharge milk suitable for consumption by one line and milk not suitable for consumption by a different line.

The above described methods and apparatuses have the disadvantage that it takes time to get an approval of the milk quality, which may result in that approved milk is lost into the milk line for non-approved milk. Also it is disadvantageous that the foremilk-sample can be diluted with ordinary milk which may start flowing past the sensors during the milk analysis and gradually makes the sample less representative of the composition of the foremilk.

SUMMARY OF THE INVENTION

An object of the invention is to solve the described problems with regard to previously known apparatuses by providing an improved method and apparatus for The problems are solved by method as initially defined comprising the following steps:

localizing at least one teat;

automatically approaching a milking means to said teat and having said means automatically performing the following steps:

stimulating the teat in order to induce milk letdown;

extraction of milk from each teat; characterized in that a first amount of the extracted milk is separated from the main milk flow and discarded;

a second amount of the extracted milk is separated from the main milk flow and analyzed, the result of the analysis being used to control at least one valve device.

A corresponding apparatus as initially defined is characterized by a separating device for separating a first amount of extracted milk from the main milk flow and discarding it, means for separating and receiving a second amount of milk from the main milk flow, said receiving means being provided with sensing means for indication of the milk quality, said sensing means being associated with a control unit for control of the milking process. A milking system according to the invention is comprised of different management concepts which are known per se such as cow identification, measuring the milk yield, milk flow and milking time, by different sensors measure deviations in the milk composition and automatic attachment and removal of the cluster. It is desirable to create a more adapted milking system, a system which is adapted to the four individual udder quarters, as it is well known that each udder quarter has individual milk flow curves, individual milking times and flow rates. Therefore, in order to create an optimal milking situation consideration has to be given to each individual quarter.

According to the invention, it is therefore advantageous to arrange the premilking of each quarter in such a way, that the first drops of milk and a predetermined volume or weight is separated from the main milk flow in the beginning of the milking Further it is advantageous to ascertain that the entire quantity of milk contained in the teat of the udder quarter in question is extracted during said premilking. This can be achieved by a special arrangement in connection with each teatcup for collecting, and analyzing said milk volume exclusive of the first drops of milk from said teat.

BRIEF DESCRIPTION OF THE DRAWINGS

The invention will be described in more detail below by means of examples of embodiments and with reference to the accompanying schematic drawings, in which.

DESCRIPTION OF THE PREFERRED EMBODIMENTS

Figure 1:
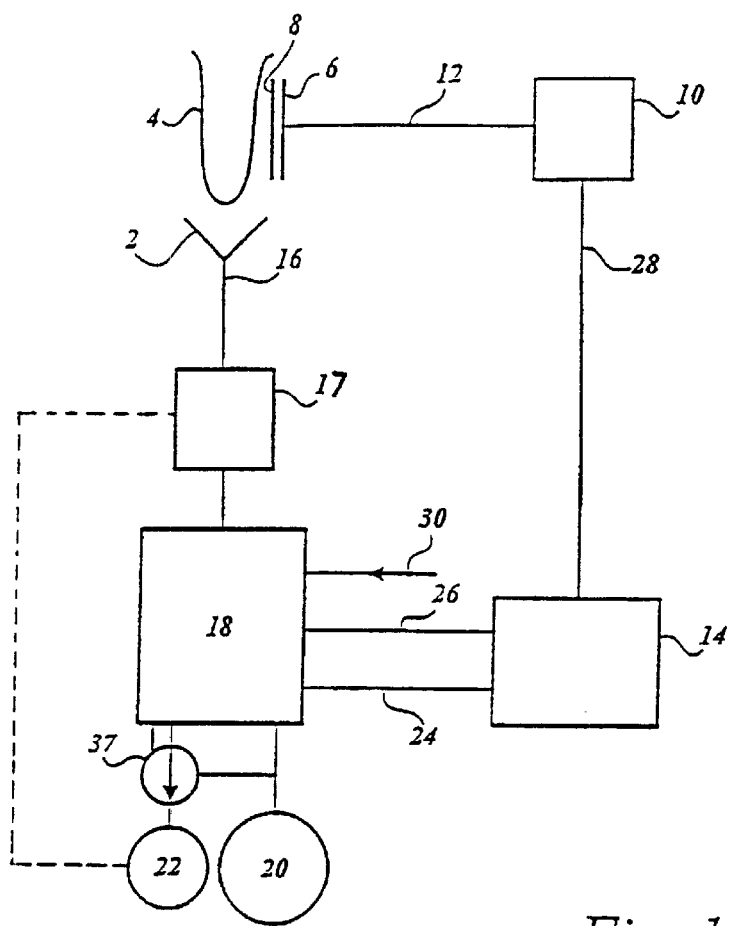
FIG. 1 is a general diagram of an apparatus for separation, analyzing and taking care of foremilk according to the invention.

FIG. 1 shows schematically an improved premilking apparatus for use in an automatic milking system, which apparatus is provided with collecting means 2 for collecting milk extracted from a teat 4. Said collecting means 2 being shaped as a hopper connected or attached to or integrated in the outlet end of an ordinary teatcup 6 with a liner 8, said teatcup and liner being shown only as a partially cutaway section. The teatcup is conventionally connected to a pulsator 10 via a pulse tube 12, which pulsator in turn is associated wit the control unit 14 of the milking system. Said collecting means 2 is provided with an outlet 16 and is associated with a device 17 for connecting and separating a first amount of milk from the extracted milk said separating device 17 being connected to a general arrangement defined as a milk selector 18 for directing the extracted milk to one of two tanks, a milk tank 20 and a waste tank 22. The separating device 17 may be embodied in various ways, which will be described later in more detail with reference to FIGS. 3–12. As is apparent from these embodiments, said first amount of milk is to be discarded, which may be arranged by feeding it to the waste tank 22. After the first amount of milk has been separated and discarded, the thereafter extracted milk is fed to said milk selector 18.

Said control unit 14 is via an input 24 provided with input signals depending on the quality of the extracted milk, which signals are generated by sensing means associated with said milk selector 18. Said sensing means will be described in detail later on. Said input signals are processed in the control unit 14, which in be generates output signals for control of the milk selector 18 via a first output 26 and for control of the pulsator 10 via a second output 28. Hence, by setting a predetermined value in the control unit 14, which depends on the required milk quality it is possible to ascertain that no foremilk or milk not suitable for human consumption comes to the milk like system including the milk tank.

To secure that no remaining non-approved milk remains in any milk tube of the system after premilking, each teatcup may be associated with a washing line 30, the details of which will be described later.

Figure 2:
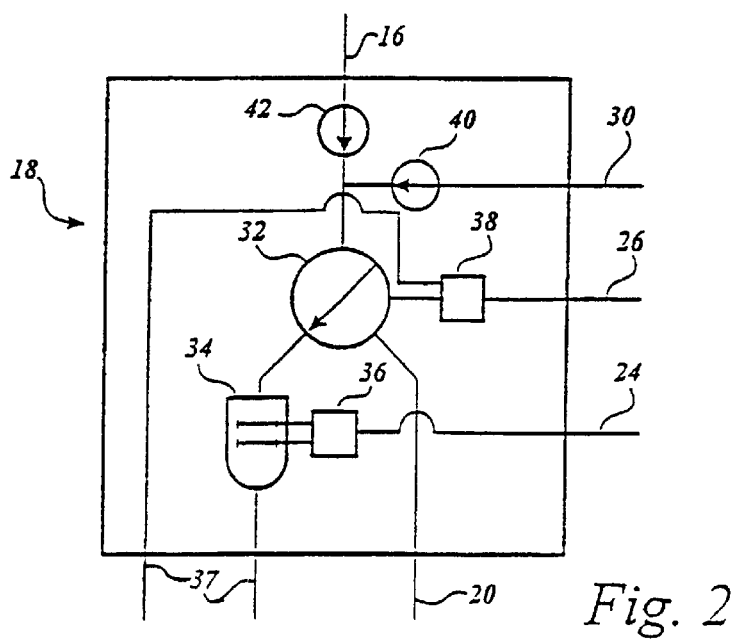
FIG. 2 is a diagram of an example of an arrangement of devices, which are included in the apparatus according to FIG. 1.
Figure 3:
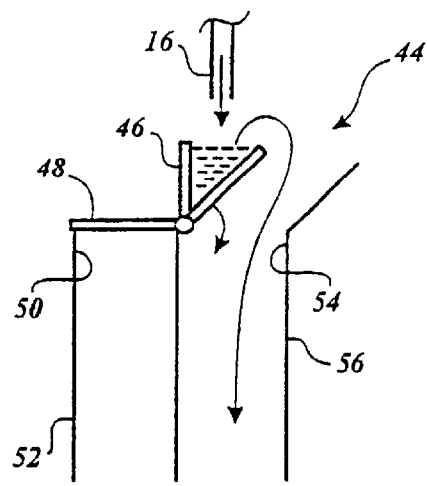
FIG. 3 is a sectional side view of a first embodiment of a separating device for collecting the first drops of milk when milking, said separating device being pivoted to a first position.

FIG. 2 shows examples of the devices of the milk selector 18 in more detail. In one example a valve device 32 is set to a first position, in which the outlet 16 is in connection with an emptyable container volume 34, having an outlet connected to the waste tank 22. Said container volume is provided with sensing means 36 for analysis of the milk quality, which sensing means is connected to the input 24 of the control unit Said valve device 32 can be set to a second position, in which the outlet 16 is connected to the milk tank 20. A three-way valve 37 (FIG. 1) can be provided between the container volume 34, the waste tank 22 and the milk line to the milk tank 20. By means of said three-way valve it is possible to connect the container volume 34 to either the waste tank 22 or the milk tank 20. The valve device 32 and the three-way valve 37 may be maneuverable between their different positions automatically by means of a maneuvering device 38, which is controlled by means of the first output 26 from the control unit Alternatively, the valve device 32 may be designed to be maneuverable between its different positions by itself, which will be described in more detail in further embodiments later on. In an advantageous improvement, the milk selector is combined with, a first check valve 40 adjacent the connecting point between the outlet 16 and the washing line or tube 30, a second check valve 42 between the collecting means 2 and said connecting point to the waiting line. Said second check valve 42 being located close to the collecting means and arranged to prevent washing liquid to enter into the teatcup and penetrate the teat orifice. Said first check valve 40 is arranged to prevent milk in the outlet 16 from entering into the washing line 30.

Figure 4:
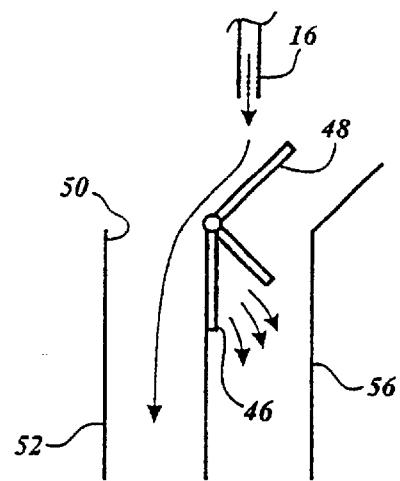
FIG. 4 is a view according to FIG. 3 with the separating device pivoted to a second position.

In a first embodiment of a separating device 44 for collecting the first drops of milk, which are assembled in a cup 46 provided with a damper means 48, which is arranged to pivot between a first position, in which an inlet 50 to a milk line 52 leading to the milk tank 20 is closed by means of gravity influence on said damper means (FIG. 3), and a second position in which said inlet is maintained open by means of gravity influence on the damper means 48 and cup 46 as well (FIG. 4). Before the separating device can pivot to its second position, the cup has to be filled up with milk from the outlet 16. The gravity influence on the milk then will tip the cup over when a predetermined small amount of drops, volume or weight has been reached and the small amount of milk is poured into an inlet 54 of a test milk line 56 leading past the sensing means 36 for analysis of the milk quality before it is fed to the waste tank 22. Simultaneously the damper means 48 is lifted up from the milkline inlet 50 by means of the pivot motion of the separating device 44, which is generated when the cup 46 tips over. Consequently, in the second position of the separating device 44 the damper means 48 is projecting from the pivot axis on its waste milk line side, as is the cup 46, which abuts on the inside of the test milk line 56. In this position the damper means 48 constitutes a guide vane 48 which directs the milk from the outlet 16 into the milk line 52. The separating device is repositioned to its first position for each complete milking sequence, for example by means of a step motor (not shown) or the like, which can be in control of the control unit 14.

Figure 5:
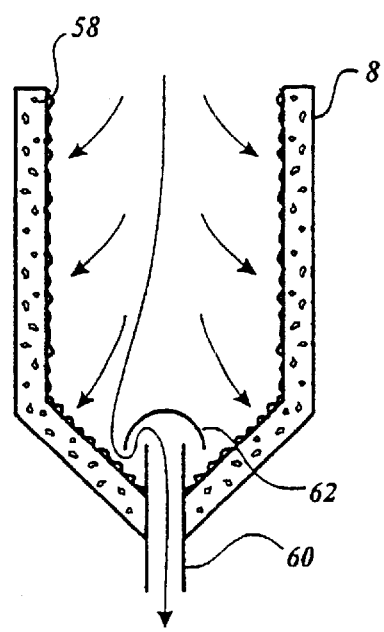
FIG. 5 is a sectional side view of a second embodiment of a separating device for collecting the first drops of milk when milking.
Figure 6:
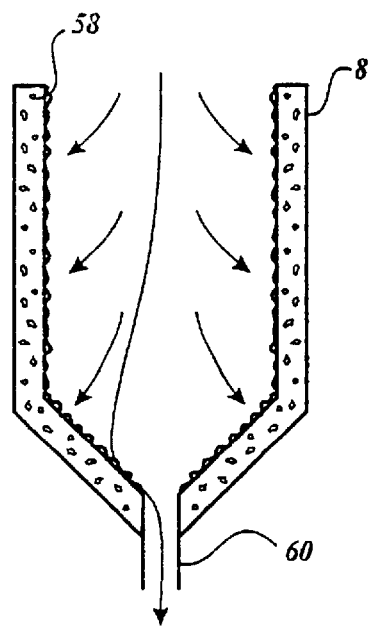
FIG. 6 is a view of a variation similar to FIG. 5.
Figure 7:
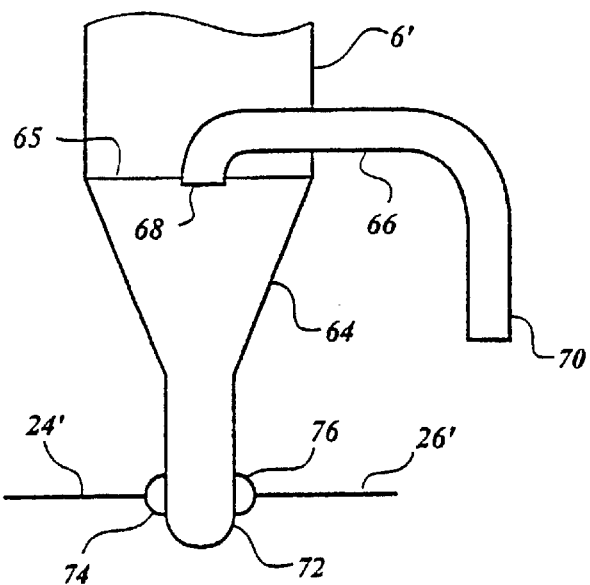
FIG. 7 shows a sectional side view of a third embodiment in accordance with FIG. 5.

An especially simple embodiment of a separating device for collecting the first drops of milk is disclosed in FIG. 5 and FIG. 6 and is accomplished by use of a special material, for example a sponge 58, advantageously arranged on the inside of the liner 8 of the teatcup and preferable close to the outlet end of the liner or of the teatcup. Said outlet end is provided with an outlet 60, via which a milk tank (not shown) is connectable direct to the milk line system which leads to the milk tank 20. A shield 62 can be arranged over the outlet 60, to prevent any of the first drops to enter into the outlet. When the milking starts, the milk drops has the surface of the sponge which absorbs the first drops until its material is saturated, which means that the following milk can pass without being contaminated of said first drops. The milk absorbed in the sponge can be used for analyzing purposes.

In a third embodiment (FIG. 7) for separation of fore milk from other milk a predetermined container volume in shape of a "blind guts" 64 is provided at the end of the teatcup, which blind gut preferable is made of a transparent material such as glass, plastic etc. and has the form of a test tube with a wider opening 65 than bottom. The opening is sealed to the lower end of a teatcup 6' and a curved discharging pipe 66 is mounted in the lower end of said teatcup. A first end 68 of said discharging pipe is directed towards the bottom of the blind gut and positioned near said sealing 65 whilst a second end of the pipe is protruding parallel to the first end on the outside of the teatcup and is intended to constitute an attachment socket 70 for the short milk tube of the teatcup. The bottom section 72 of the blind gut is provided with a light emitting means 74 and on the opposite side of the section 72 is provided a light sensing means 76. Said light emitting means 74 and said light sensing means 76 are advantageously connected to the input 24' and the output 26' respectively of the control unit 14. At the begin of a milking sequence a predetermined volume of milk has to be filled up in the blind gait 64 before the milk can pass by to be discharged via the discharging pipe 66 into the milk line. Said milk volume is used for a fast optical analysis, by means of the light sensing means 76, to determine if there is any blood or clots in the foremilk If attentive the milking sequence is interrupted for the quarter in question Alternatively the optical analysis can be carried out manually.

Figure 8:
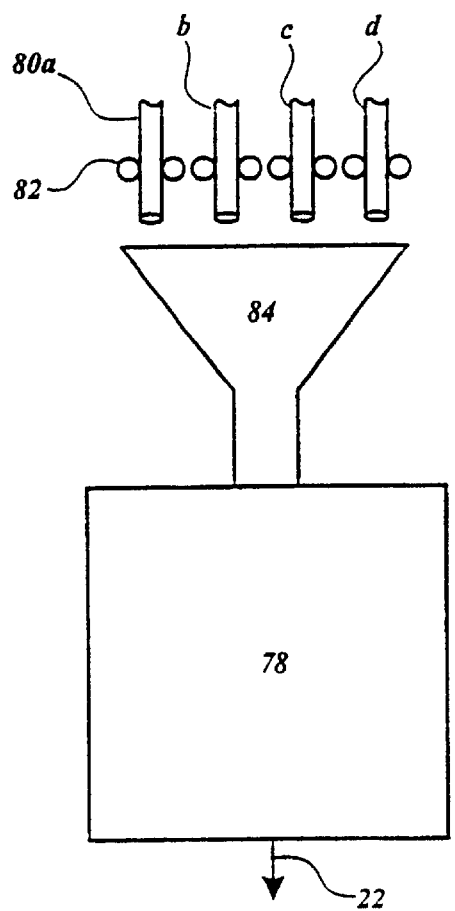
FIG. 8 is a side view of a central arrangement of an analyzing station.
Figure 9:
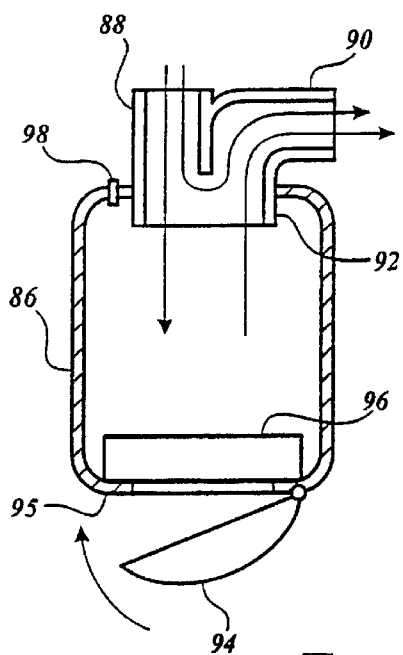
FIGS. 9–12 are sectional views of different states of a fourth embodiment of a separating device for collecting the first drops of milk when milking.

FIG. 8 shows an advantageous arrangement, for copying out a money saving procedure, by means of which a central analyzing station 78 is used for all milking stands (not shown) that are served by a milking robot (not shown). Said analyzing station may be provided with sensing means for analysis of the milk quality comprising means 36' for measuring the volume and conductivity of the milk or light sensors 74', 76' for optical analysis as to the presence of blood or clots in the milk One testing line 80 a, b, c, d at a time is connected between each teatcup of each cluster and the analyzing station 78. Each testing line is provided with a corresponding clamping device 82, by means of which the testing line in question can be opened or closed depending on signals from the control unit 14". The milk from each testing line is delivered into a hopper 84 and fed to the sensing means 36', 74', 76' of the analyzing station or milk multiplexor 78. After the analysis the analysed milk is discarded into the waste tank 22.

Figure 10:
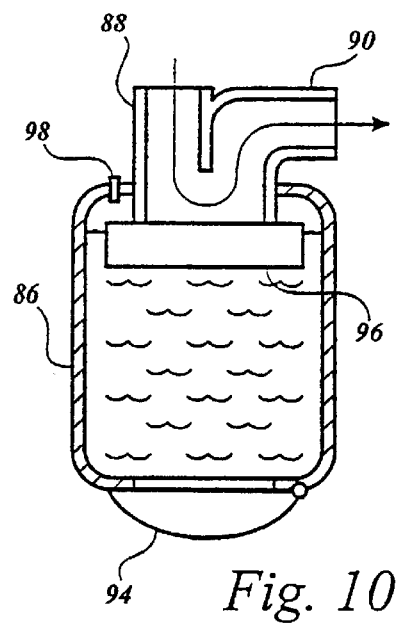
Figure 11:
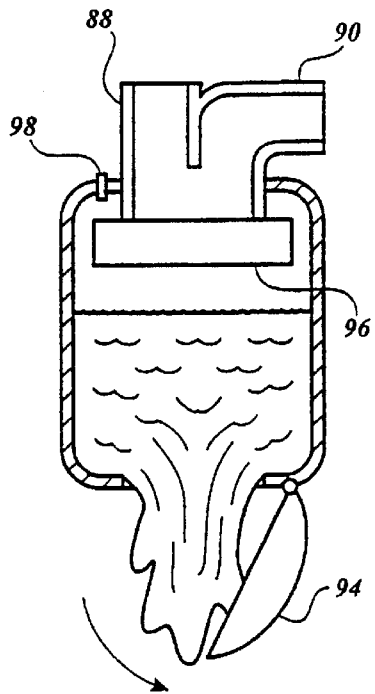
Figure 12:
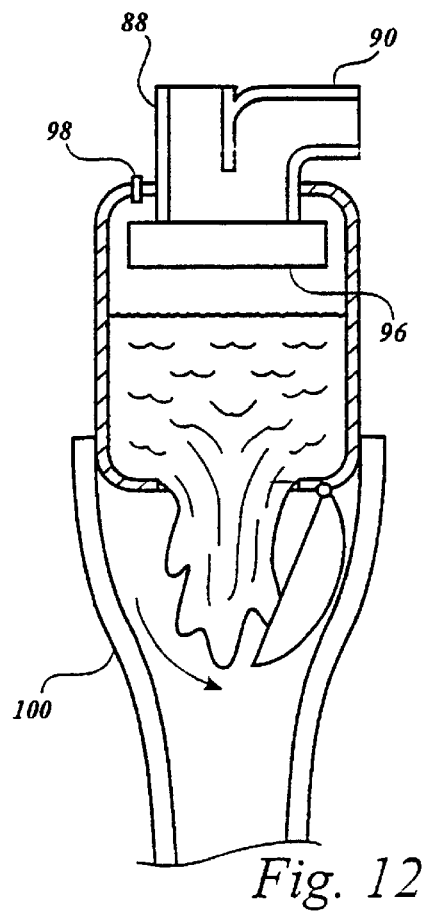

FIG. 9–12 show different states of a fourth embodiment of a separating device for collecting the first drops of milk during a milking sequence to avoid that the fore milk contaminates other, subsequently following milk and to secure that the fore milk is not let out on the floor of the milk parlour. Each teatcup 6" is provided with a container cup 86, which is filled up with milk (fore milk) and subsequently automatically emptied. Said cup is provided with a milk inlet 88 for connection to a short milk tube of a teatcup (not shown) and a vacuum coupling 90 for connection to a vacuum source via a milk line (not shown). Said milk inlet 88 and coupling 90 are in communication with each other and with a inlet nipple 92 on the inside of the cup 86. Further the cup is provided with a check valve 94, which is closable against opening flange 95, surrounding an opening in the bottom of the cup, by the influence of a vacuum inside the cup. A float valve disc 96 made of a low density (density>1) material is freely moveable in the cup between a initial position resting on said flange 95 and an activated position, in which the disc seals against the inlet nipple 92. An air intake 98 is a arranged through the top of the cup, which air intake preferably constitutes of an orifice of a diameter in an interval between 0.1–1.5 mm FIG. 9 disclose the separating device upon start of a milking sequence. As soon as a vacuum is present in the cup 86, the check valve 94 is influenced of said vacuum and closed against the opening flange 95. As the milk starts flowing through the inlet nipple 92 the cup will soon be filled with milk and the float disc 96 will be floating on the milk surface. When the cup 6 is full, the float disc seals against the inlet nipple and the milk is fed through the coupling 90 and further into the milk line of the system (FIG. 10). By means of the control unit 14" the cup is then cut off from the vacuum source, then the air intake 98 fills the vacuum up, the check valve opens under the influence of gravity and a predetermined volume of milk (fore milk) corresponding to the volume of the cup 86 is poured out, preferably into a receptacle and may be used for analysing purposes as in previously described embodiments. (FIG 11). In FIG. 12 a variation of the fourth embodiment is shown, in which the cup 86 is arranged in a tube 100, which is connected to a separate system with a lower (more powerful) vacuum than the milking vacuum. The predetermined volume of milk is via said tube fed into said separate system. As an advantageous alternative or combination to the described embodiments for separation, assembling and analysing of the fore milk, the pulsator 10' may be stopped with atmosphere pressure in the pulsating tubes during a sufficient long time to carry out the analysis.

Figure 13:
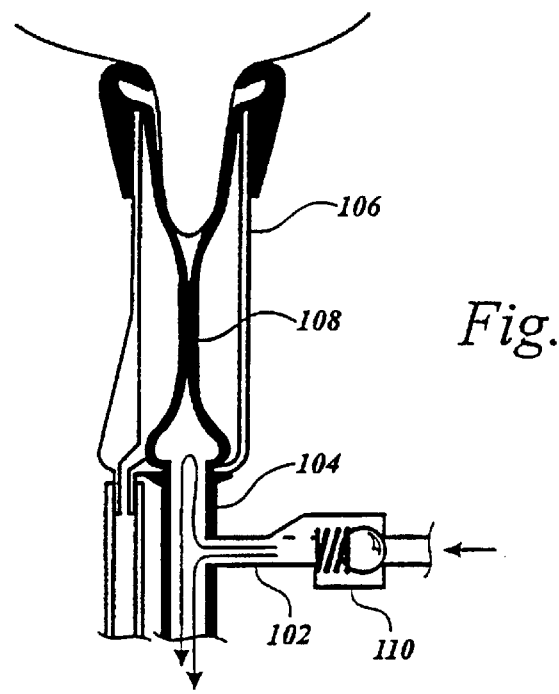
FIG. 13 is a sectional side view of an arrangement for cleaning the milk tube after the premilking phase.
Figure 14:
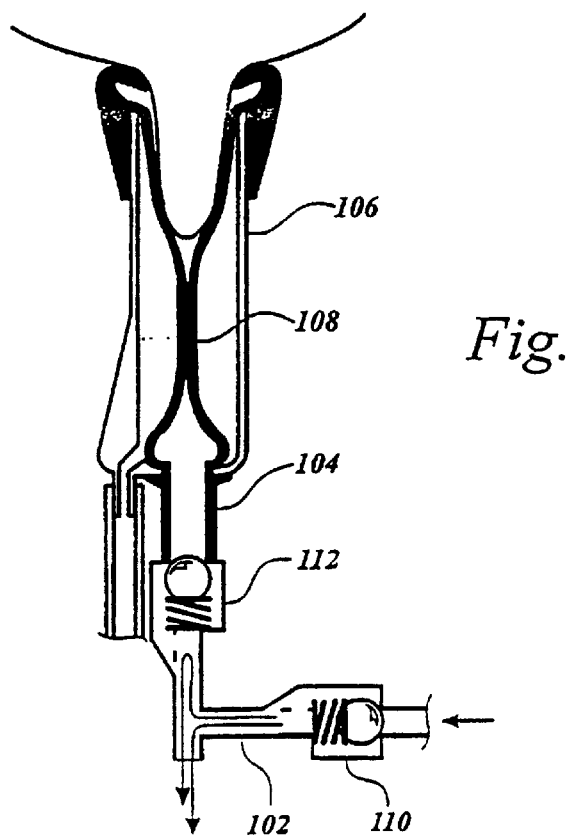
FIG. 14 is a view of a variation similar to FIG. 13.

A further embodiment for premilking and subsequent cleaning of the milk tube after the premilking phase is disclosed in FIG. 13 and FIG. 14, in which embodiment a washing tube 102 is connected to the short my tube 104 immediately under the teatcup 106 and which short milk tube is connected to or integrated in a liner 108 in said teatcup. After a few pulsations, which corresponds to the of the fore milk the pulsation are interrupted with collapsed liner 108, by means of the control unit 14" and the pulsator 10". Water alternatively water with mixed in air from said washing tube is let into said milk tube 104 and flushes the remaining foremilk away and cleans the milk tube. A set of valves (not shown) located further on in the system guides the cleaning fluid and milk fragments to a required position in the system. In FIG. 13 is shown a pressure-reducing check valve 110 of a kind known per se, which is provided in the connection between the tube 102 and the teatcup 106. Said check valve prevents milk from entering into the washing tube. In the variation shown in FIG. 14, both of the milk tube 104 and the wing tube 102 each are provided with a check valve 110 for preventing milk from entering into the washing tube and a father check valve 112 of identical design, which is arranged in the short milk tube between the teatceup 106 and said connection of the check valve 110, which is provided in the washing tube 102. Said farther check valve prevents cleaning fluid from entering via the collapsed liner into upper part of the teatcup, which could cause severe damage on the end of the teat and the teat orifice. In this variation the system which is intended to like care of the for milk is working a a higher van than the milk line system.

The sensing means for analysis of the milk quality may be of any known kind including light emitting diodes (LED), light sensing means, infrared detectors and video systems and also measuring of the milk conductivity, milk volume or milk weight.

While the invention has been illustrated by examples of embodiments related to automatic milking system it is conceivable that the described devices for separating, analyzing and disposing of foremilk and the tube cleaning devices, may be used in semi-automatic or manual milking systems as well.

The above mentioned category of lactating animals comprise all such animals as cows, sheep, goats, horses, buffaloes etc.

Further, while the illustrated examples of embodiments are related to the separation of a predetermined amount of milk during pregnancy, which milk upon approval can be returned to the main milk flow or otherwise discarded, it is conceivable that first amount of the extracted milk is separated from the main milk flow and discarded, independent of the result of the analysis. Consequently the invention comprise the following advantageous steps of milking: The first amount of the extracted milk is separated and discarded; then a predetermined amount of milk is separated, which can be returned to the main milk flow upon approval, after which the main milking process is started. On a negative result of the analysis the milking process may be interrupted.

What is claimed is:

1. A method of preparing a lactating animal for milking comprising the following steps:

localizing at least one teat (4);
   automatically approaching a milking means (6, 8) to said teat and having said means automatically performing the following steps:
      stimulating the teat in order to induce milk letdown;
      extraction (2) of milk from each teat;
   characterized in that
      a first amount of the extracted milk is separated (17, 44, 58, 96) from the main milk flow and discarded;
      a second amount of the extracted milk is separated (18, 32) from the main milk flow and analyzed (34, 36, 64, 78), the result of the analysis being used to control at least one valve device (32, 37) for directing said second amount of milk to a selected tank (20,22).

2. A method according to claim 1, characterized in that if the analysis of said second amount is approved, the thereafter extracted milk is introduced (32, 37) into the main milk flow to the milk tank (20).

3. A method according to claim 2, characterized in that the extracted milk exclusive of the first amount extracted is separated from the main milk flow and delivered to a first receptacle (34, 64, 84).

4. A method according to claim 3, characterized in that the milk content in the first receptacle (34, 64, 84) is analyzed (36) to find out whether the milk fulfills all conditions required to continue the milking process.

5. A method according to claim 4, characterized in that if said conditions are not fulfilled then the content of the first receptacle (34, 84) is emptied into the second receptacle (22).

6. A method according to claim 5, characterized in that the milking process is interrupted.

7. A method according to claim 4, characterized in that if said conditions are fulfilled the milking process continued.

8. A method according to claim 7, characterized in that the content of the first receptacle (34) is re-introduced (37) into the main milk flow.

9. A method according to claim 1, characterized in that if the analysis of said second amount is not approved, the thereafter extracted milk is separated from the main milk flow and guided (32, 37) to a second receptacle (22) for collecting and storing and/or disposing of milk unsuitable for human consumption.

10. An apparatus for preparing a lactating animal for milking in accordance with claim 1, characterized by a separating device (17, 44, 58, 64, 86) for separating a first amount of extracted milk from the main milk flow and discarding it, means for separating (32) and receiving (34, 64, 84) a second amount of milk from the main milk flow, said receiving means (34, 64, 84) being provided with sensing means (36, 74, 76) for indication of the milk quality, said sensing means being associated with a control unit (14) for control of the milking process.

11. An apparatus according to claim 10, characterized in that signals (24) dependent on the milk conditions are generated by said sensing means (36, 74, 76), which signals are fed (24) to the control unit (14).

12. An apparatus according to one of claim 11, characterized in that the signals generated by the indicating means (36, 74, 76) are used to manipulate the valves of a slaved pulsator (10) of the milking means, thereby enabling the milk flow to be stopped by means of said pulsator, which can be stopped at a predetermined state for a predetermined period of time suitable to perform the analyzing process.

13. An apparatus according to claim 10, characterized in that the volume of a first receptacle (34, 64, 84) is adapted to a predetermined volume of foremilk and that a controlled quantity of milk is obtained by filling up said first receptacle.

14. An apparatus according to claim 10, characterized in that said separating device (44) is comprised of an milk assembling means (46) associated with a damper means (48), being pivotable between a first position and a second position under influence of the gravity force.

15. An apparatus according to claim 10, characterized in that said separating device is comprised of a sponge (58) arranged inside a teatcup liner (8), said sponge (58) being arranged to absorb milk drops until the sponge material is saturated, whereafter filer milk drops enter an outlet (60) provided at the outlet end of the liner (8).

16. An apparatus according to claims 10, characterized in that said separating device (64) is comprised of a blind gut (64) provided at the end of a teatcup (6'), which blind gut must be filled up before milk is allowed to pass by to be discharged via a discharging pipe (66), which is provided with a first end (68) at a predetermined level of said blind gut.

17. An apparatus according to claim 10, characterized in that said separating device is comprised of a container means (86), which is provided with an inlet (88) for connection to a milk tube, a vacuum coupling (90) for connection to a vacuum source, said inlet and coupling being mutual in communication by means of a nipple (92) inside of the container means (86) and a check valve (94) is closable an opening flange (95), said nipple (92) being sealable by means of a float disc (96), when the container means (86) is filled up with milk.

18. An apparatus according to claim 10, characterized in that the milking means is comprised of a teatcup (6'), in which the first receptacle (64) is integrated and made available for optical analysis (74, 76) of milk contained, and that the outlet (70) from the teatcup is so arranged, that the first receptacle (64) has to be filled up (68) with milk before the milk is allowed to pass through the outlet (70) into the main milk flow.

19. An apparatus according to claim 10, characterized in that a central analyzing station (78) is arranged for all milking positions related to at least one milking robot, and that a testing tube (80) is closeably connected (82) between the first receptacle (46) and the central analyzing station.

* * * * *